United States Patent [19]

Kniepkamp

[11] Patent Number: 5,124,905
[45] Date of Patent: Jun. 23, 1992

[54] POWER SUPPLY WITH FEEDBACK CIRCUIT FOR LIMITING OUTPUT VOLTAGE

[75] Inventor: David I. Kniepkamp, Fairview Heights, Ill.

[73] Assignee: Emerson Electric Co., St. Louis, Mo.

[21] Appl. No.: 734,169

[22] Filed: Jul. 22, 1991

[51] Int. Cl.⁵ .................................. H02M 3/335
[52] U.S. Cl. .......................... 363/19; 363/97; 323/903; 361/235; 55/139
[58] Field of Search ............... 363/18–19, 363/97; 323/903; 55/105, 139; 361/235

[56] References Cited

U.S. PATENT DOCUMENTS

| | | | |
|---|---|---|---|
| 4,378,585 | 3/1983 | Bete | 363/19 |
| 4,507,131 | 3/1985 | Fathauer et al. | 55/104 |
| 4,562,522 | 12/1985 | Adams et al. | 363/21 |
| 4,651,264 | 3/1987 | Shiao-Chung Hu | 363/18 |
| 4,654,772 | 3/1987 | Thorne | 363/19 |
| 4,862,338 | 8/1989 | Tanaka | 363/19 |

*Primary Examiner*—Steven L. Stephan
*Assistant Examiner*—Adolf Berhane
*Attorney, Agent, or Firm*—Paul A. Becker, Sr.

[57] ABSTRACT

A self-resonating power supply for controlling operation of an electrostatic air cleaner wherein the ouput voltage to the cell is limited to a desired value by means of a regulated feedback circuit so as to prevent nuisance arcing in the cell and to minimize generation of ozone. The feedback circuit detects changes in the output voltage and responds to such changes by changing the biasing of a switching transistor so as to cause the output voltage to return to the desired value.

1 Claim, 1 Drawing Sheet

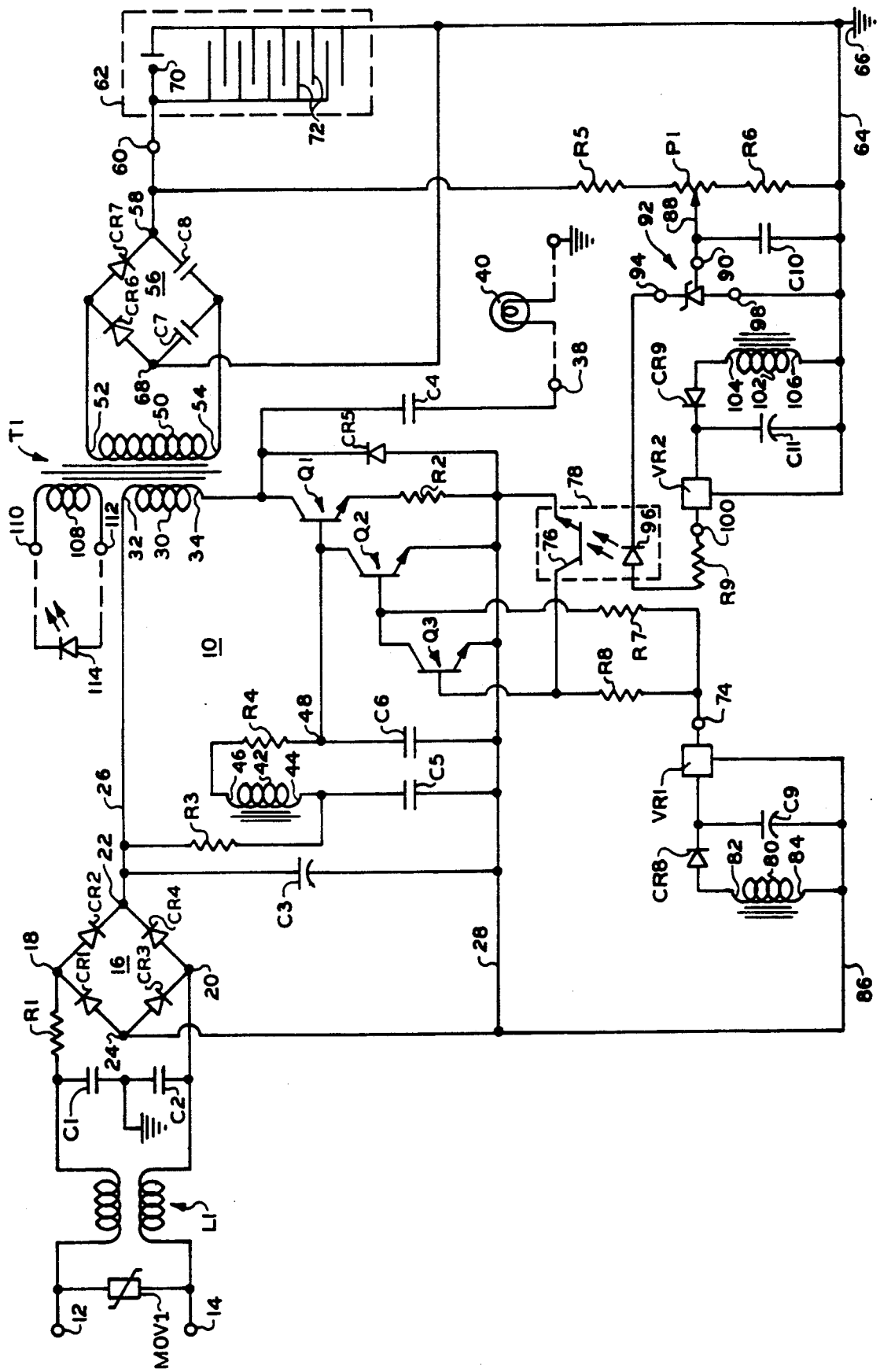

POWER SUPPLY WITH FEEDBACK CIRCUIT FOR LIMITING OUTPUT VOLTAGE

BACKGROUND OF THE INVENTION

This invention relates to power supplies for controlling operation of electrostatic air cleaners.

It is desirable, in an electrostatic air cleaner, to limit the voltage produced by the power supply and applied to the cell to a value which will not cause arcing to occur in the cell and which will minimize the generation of ozone. Such arcing, if allowed to occur, produces an audible noise which is a nuisance to the homeowner; ozone, if present in high levels of concentration, is an undesirable odor.

The prior art discloses various power supplies used in or possibly, adaptable for use in electrostatic air cleaners, some of which appear to provide some type of voltage-limiting function. However, such voltage-limiting power supplies are believed to be relatively complex, expensive, and/or not sufficiently accurate at the high voltage levels utilized in electrostatic air cleaners.

SUMMARY OF THE INVENTION

A primary object of this invention is to provide a generally new and improved power supply for an electrostatic air cleaner.

A further object is to provide a self-resonating power supply wherein a feedback circuit is effective to limit the output voltage.

In accordance with the present invention, there is provided a self-resonating power supply for controlling operation of an electrostatic air cleaner cell wherein the output voltage to the cell is limited to a desired value by means of a feedback circuit so as to prevent nuisance arcing in the cell and to minimize the generation of ozone. The feedback circuit includes a first regulated power supply for providing a stable voltage source to the light-emitting diode of an optical coupler which has current through it in proportion to the output voltage. The feedback circuit further includes a second regulated power supply for providing a stable voltage source to a circuit which shunts the biasing of a switching transistor, such shunting circuit including the phototransistor of the optical coupler. As the output voltage changes, the feedback circuit detects and compensates for such changes by changing the biasing of the switching transistor so as to cause the output voltage to return to the desired value.

The above-mentioned and other objects and features of the present invention will become apparent from the following description when read in conjunction with the accompanying drawing.

BRIEF DESCRIPTION OF THE DRAWINGS

The single FIGURE of the drawing is a schematic diagram of the power supply for the present invention.

DESCRIPTION OF THE PREFERRED EMBODIMENT

Referring to the drawing, the power supply 10 of the present invention is connected at terminals 12 and 14 to a conventional 120 volt alternating current power source. Connected across the 120 volt source is a metal oxide varistor MOV1 for clamping any high voltage spikes that may occur in the 120 volt source. Also connected across the 120 volt source is an RFI (radio frequency interference) filter circuit, comprising a choke coil L1 and capacitors C1 and C2, for filtering out any high frequency electrical noise that might otherwise be transmitted from power supply 10 back to the 120 volt source. A full-wave bridge circuit 16, comprising rectifiers CR1, CR2, CR3, and CR4, is connected at input junction 18 thereof through a current limiting resistor R1 and a portion of choke coil L1 to power source terminal 12, and at input junction 20 thereof through another portion of choke coil L1 to power source terminal 14.

Connected across output junctions 22 and 24 of bridge circuit 16 is a capacitor C3. Capacitor C3 effects the establishment of a filtered unidirectional power source between a lead 26 connected to output junction 22 and a lead 28 connected to output junction 24.

The primary winding 30 of a transformer T1 is connected at one end 32 to lead 26 and at its other end 34 to the collector of an NPN transistor Q1. The emitter of transistor Q1 is connected through a resistor R2 to lead 28. A rectifier CR5 is connected in reverse polarity across the series-connected transistor Q1 and resistor R2 to protect transistor Q1 from any reverse polarity voltage spikes. A capacitor C4 is connected between the collector of transistor Q1 and an output terminal 38 to which a neon bulb 40 can be connected.

Transformer T1 includes a secondary winding 42 having one end 44 connected through a resistor R3 to lead 26, and through a capacitor C5 to lead 28. The other end 46 of secondary winding 42 is connected through a resistor R4 and a capacitor C6 to lead 28. The junction 48 between resistor R4 and capacitor C6 is connected to the base of transistor Q1.

Transformer T1 also includes another secondary winding 50. Connected to ends 52 and 54 of secondary winding 50 is a voltage-doubler circuit 56 comprising rectifiers CR6 and CR7 and capacitors C7 and C8. One output junction 58 of circuit 56 is connected to an output terminal 60 to which an electrostatic air cleaner cell 62 is connected. Output junction 58 is also connected through a resistor R5, a potentiometer P1 and a resistor R6 to a lead 64 which is earth-grounded at 66. The other output junction 68 of voltage-doubler circuit 56 is connected to ground 66. The turns ratio between primary winding 30 and secondary winding 50 and the operation of voltage-doubler circuit 56 are such that power supply 10 is capable of producing an output voltage of approximately 10,000 volts at output terminal 60. As will hereinafter be described, a salient feature of the present invention is that the output voltage is limited to a lesser value.

Air cleaner cell 62 is a two-stage cell and includes an ionizing section and a collector section. The ionizing section comprises a plurality of ionizing wires 70 which are connected to the high voltage power supply output terminal 60. The collector section includes a plurality of spaced plates 72 alternately connected to output terminal 60 and to ground 66. A typical cell of this type is shown in U.S. Pat. No. 4,089,661, issued May 16, 1978, to Jimmy T. Milum.

Connected to the base of transistor Q1 is the collector of an NPN transistor Q2. The emitter of transistor Q2 is connected to lead 28. Connected to the base of transistor Q2 is the collector of an NPN transistor Q3. The emitter of transistor Q3 is connected to lead 28. The collector of transistor Q3 is connected through a pull-up resistor R7 to the output terminal 74 of a voltage regulator VR1. The output phototransistor 76 of an optical coupler 78 is connected between the base of transistor Q3 and lead 28. The collector of phototransistor 76 is connected through a pull-up resistor R8 to the output terminal 74 of voltage regulator VR1.

Voltage regulator VR1 provides a stable 5-volt direct current power source at its output terminal 74. Power to voltage regulator VR1 is provided by another secondary winding 80 of transformer T1. Secondary winding 80 is connected at one end 82 through a rectifier CR8 to the input of voltage regulator VR1, and at its other end 84 to a lead 86 which is connected to lead 28. A filter capacitor C9 is connected between the cathode of rectifier CR8 and lead 86.

The adjusting portion 88 of potentiometer P1 is connected to a voltage responsive input terminal 90 of a transconductance amplifier indicated generally at 92. The current input terminal 94 of amplifier 92 is connected to the light-emitting diode 96 of optical coupler 78. The current output terminal 98 of amplifier 92 is connected to lead 64. A filter capacitor C10 is connected between input terminal 90 and lead 64.

Light-emitting diode 96 of optical coupler 78 is connected through a current-limiting resistor R9 to the output terminal 100 of a voltage regulator VR2 which provides a stable 5-volt direct current power source at its output terminal 100. Power to voltage regulator VR2 is provided by another secondary winding 102 of transformer T1. Secondary winding 102 is connected at one end 104 through a rectifier CR9 to the input of voltage regulator VR2, and at its other end 106 to lead 64. A filter capacitor C11 is connected between the cathode of rectifier CR9 and lead 64.

Transformer T1 includes another secondary winding 108 connected to output terminals 110 and 112 to which a light-emitting diode 114 can be connected.

OPERATION

When power is initially applied to circuit 10, transistor Q1 is forward biased on through a circuit from lead 26, through resistor R3, secondary winding 42, resistor R4, the base-emitter circuit of transistor Q1, and through resistor R2 to lead 28. With transistor Q1 biased on, current begins to flow from lead 26 through primary winding 30, the emitter-collector of transistor Q1, and resistor R2. The change or increase in current flow through primary winding 30 10 causes an increasing magnetic flux to develop in transformer T1. This increasing magnetic flux induces a voltage in the inductively coupled secondary winding 42. The polarity of this induced voltage is such that end 46 of secondary winding 42 becomes increasingly positive, resulting in more forward biasing of transistor Q1.

When the current flow through primary winding 30 ceases to change, there is no longer a change in flux so that the induced voltage in secondary winding 42 goes to zero. Under this condition, transistor Q1 is no longer forward biased and thus turns off. When transistor Q1 turns off, the current flow through primary winding 30 abruptly ceases. This abrupt change in current flow causes a reverse voltage to be induced in secondary winding 42, the polarity of which is such that end 46 of secondary winding 42 goes negative. As end 46 goes negative, it reverse biases transistor Q1. The reverse voltage has a damped oscillatory characteristic. Subsequently, at the next positive swing, wherein end 46 begins to go positive again, transistor Q1 is again turned on so as to initiate another oscillation cycle. The impedances of the circuit components of power supply 10 are such that the frequency of oscillation is between 60 KHz and 80 KHz.

The above-described rise and collapse of flux in transformer T1 also induces a voltage in secondary winding 50. This voltage is doubled by circuit 56 and applied to output terminal 60 and to series-connected resistor R5, potentiometer P1, and resistor R6.

The value of the voltage induced in secondary winding 50 is dependent upon the characteristics of the current flow through primary winding 30 which, in turn, is dependent upon the operating characteristics of transistor Q1. Specifically, secondary winding 42 provides the source of biasing current for transistor Q1. The amplitude of the current flow through the emitter-collector circuit of transistor Q1, and thus through primary winding 30, is limited by the value of resistor R2. The amount of biasing current that flows through the base-emitter circuit of transistor Q1 is limited by resistors R4 and R2 and, as will hereinafter be described, is dependent upon a feedback circuit which is responsive to the value of output load.

Air cleaner cell 62 is constructed in such a manner, for example, with regard to specific spacings between ionizing wires 70 and plates 72 and between alternate plates 72, so that it is desirable that the voltage at output terminal 60 be approximately 6500 volts. At such voltage and when cell 62 is clean, the ionizing wires 70 and the plates 72 in cell 62 establish the required conditions for effectively filtering out dirt particles and various other contaminants, and doing so without arcing.

Air cleaner cell 62, when clean, draws approximately 1.25 milliamperes when the voltage at output terminal 60 is 6500 volts. Such current flow is essentially a leakage current which flows between ionizing wires 70 and those plates 72 that are grounded, and between opposite-polarity plates 72. When cell 62 is clean, a voltage of 6500 volts is adequate to satisfy the 1.25 milliampere current flow requirement of cell 62. However, when cell 62 becomes dirty, the effective impedance of cell 62 increases, thus decreasing the leakage current. The decrease in leakage current is interpreted by the oscillating portion of power supply 10 as an energy loss. A salient feature of the present invention is to prevent such a decrease in leakage current from allowing the oscillating portion of power supply 10 to pump energy into power supply 10 which would increase the voltage at output terminal 60 to a value above 6500 volts.

With power applied to terminals 12 and 14 and with an electrical load connected to output terminal 60 and such load drawing approximately 1.0 milliampere, potentiometer P1 is factory adjusted to provide a voltage of approximately 6500 volts at output terminal 60. This results in the establishment of a reference voltage at terminal 90 of amplifier 92. With the reference voltage at terminal 90, current flows from voltage regulator VR2 through resistor R9, light-emitting diode 96, into amplifier at terminal 94, and out of amplifier 92 at terminal 98. The current flow through amplifier 92, and thus the current flow through diode 96, is proportional to the voltage at terminal 90.

Current flow through diode 96 causes phototransistor 76 to conduct, the amount of conduction being dependent upon the amount of current flow through diode 96. When phototransistor 76 is conductive, it shunts part of the current that flows through resistor R8 and the base-emitter circuit of transistor Q3. Current also flows through resistor R7. With transistor Q3 conducting to some degree, some of the current flow through resistor R7 flows through the collector-emitter circuit of transistor Q3, and some flows through the base-emitter circuit of transistor Q2. With transistor Q2 conducting to some degree, some of the biasing current provided by secondary winding 42 of transistor Q1 is shunted through the emitter-collector circuit of transistor Q2.

Under the factory-adjustment condition, transistor Q1 is biased to such a degree so that, when it is conductive, it allows sufficient current to flow through its emitter-collector circuit, and thus through primary winding 30 and resistor R2, so as to provide, upon repetitive turning on and off at the oscillating frequency, subsequent rise and fall of flux in transformer T1 for effecting an output voltage of 6500 volts at output terminal 60.

As previously described, cell 62 draws 1.25 milliamperes. Thus, when power supply 10 is connected to cell 62, the impedance of cell 62 is less than the load impedance used in factory adjustment. The output voltage at terminal 60 and at junction 58 decreases. The voltage at terminal 90 of amplifier 92 thus decreases, resulting in less current flow through diode 96 of optical coupler 78. Phototransistor 76 conducts less, thus shunting less current from the base-emitter circuit of transistor Q3. More current thus flows through the emitter-collector circuit of transistor Q3 so that less current flows through the base-emitter circuit of transistor Q2. Less current thus flows through the emitter-collector circuit of transistor Q2 thereby shunting less biasing current from transistor Q1. With transistor Q1 biased to a greater degree than it was biased at the factory adjustment, it conducts more current and the output voltage at terminal 60 increases back to its original value of 6500 volts.

As cell 62 becomes dirty, its impedance increases. The increase in impedance causes the output voltage at terminal 60 and at junction 58 to increase. The voltage at terminal 90 of amplifier 92 thus increases, resulting in more current flow through diode 96 of optical coupler 78. Phototransistor 76 conducts more, thus shunting more current from the base-emitter circuit of transistor Q3. Less current thus flows through the emitter-collector circuit of transistor Q3 so that more current flows through the base-emitter circuit of transistor Q2. More current thus flows through the emitter-collector circuit of transistor Q2 thereby shunting more biasing current from transistor Q1. With transistor Q1 biased to a lesser degree than it was when cell 62 was clean, it conducts less current and the output voltage at terminal 60 decreases back to its original value of 6500 volts.

The ability of power supply 10 to accurately adjust its output as described above is due in large part to the use of a voltage regulated power source for both the light-emitting diode 96 and the phototransistor 76 in optical coupler 78. Specifically, because of voltage regulator VR2, the current through diode 96 is accurately controlled by the voltage at terminal 90 of amplifier 92, which voltage is directly proportional to the output voltage at terminal 60. Because of voltage regulator VR1, the amount of current flow through phototransistor 76 and ultimately the amount of biasing of transistor Q1 is dependent upon the current flow through diode 96 and thus, ultimately, upon the output voltage of terminal 60.

Power supply 10 can be used with other cells which require 6500 volts for proper operation, so long as the current requirement of such a cell does not exceed approximately 2.0 milliampere. It should be noted that power supply 10 could also be used with cells which require a voltage somewhat less than or greater than 6500 volts by simply adjusting potentiometer P1 for the desired value of output voltage.

While power supply 10 is effective to minimize arcing as cell 62 becomes dirty, arcing will eventually occur when the cell becomes extremely dirty. Specifically, when cell 62 is extremely dirty, the layers of contaminants on plates 72 effectively reduce the spacings between alternate ones of plates 72 to the degree that, with 6500 volts applied to cell 62, arcing will occur between plates 72. When such arcing occurs, the arc appears as an electrical short across the output of secondary winding 50. With secondary winding 50 shorted, secondary winding 42 is also effectively shorted whereby power supply 10 momentarily stops oscillating. Continued arcing of this type will cause light-emitting diode 114 or neon bulb 40, whichever of the two are utilized, to blink on and off as the oscillations stop and start, thus providing a visual indication that cell 62 requires cleaning.

I claim:

1. In a self-resonating power supply for controlling operation of an electrostatic air cleaner cell,
   a transformer having a primary winding and first and second secondary windings;
   a first transistor connected in series with said primary winding,
   said first secondary winding being effective to successively bias said first transistor on and off,
   said second secondary winding being effective to provide an output voltage to said cell; and
   feedback circuit means having first and second circuit portion,
   said first circuit portion including a first regulated power source and first circuit means connected therewith and being responsive to said output voltage for providing an output proportional to said output voltage,
   said second circuit portion including a second regulated power source and second circuit means connected therewith and being responsive to said output of said first circuit portion for controlling shunting of said biasing of said first transistor so as to limit said output voltage to said cell to a desired value,
   said first circuit means including voltage divider means connected across the output of said power supply and including a potentiometer, a transconductance amplifier having its voltage responsive input terminal connected to said potentiometer, and a light-emitting diode of an optical coupler connected in series with the output of said first regulated power source and a current-carrying portion of said amplifier,
   said second circuit means including second and third transistors and a phototransistor of said optical coupler, said second regulated power source being connected to said second and third transistors and to said phototransistor and said second transistor being connected to said first transistor so that said second transistor is effective to control said shunting of said biasing of said first transistor in response to the amount of current flow through said phototransistor.

* * * * *